March 24, 1970 N. SCHÜRZINGER ET AL 3,502,993

DIGITIZER HAVING VARIABLE THRESHOLD CONTROLLED BY SIGNAL AND BACKGROUND SIGNAL COMPARISON

Filed June 7, 1966 2 Sheets-Sheet 1

1

3,502,993

DIGITIZER HAVING VARIABLE THRESHOLD CONTROLLED BY SIGNAL AND BACKGROUND SIGNAL COMPARISON

Norbert Schürzinger, Munich, and Wolfgang Mayer, Munich-Obermenzing, Germany, assignors to Siemens Aktiengesellschaft, Munich, Germany Filed June 7, 1966, Ser. No. 555,851
Claims priority, application Germany, June 18, 1965, S 97,683
Int. Cl. H03k 17/30
U.S. Cl. 328—151 5 Claims

ABSTRACT OF THE DISCLOSURE

In a system for digitizing signals which are recorded on a record carrier and detected by scanning the carrier, changes in the background level and in the signal level not related to signal information are compensated for by detecting the signal level and the background level separately, and using the comparision therebetween to control the threshold of the digitizing circuit. Short term variations may also be compensated for by employing a storage circuit having approximately equal charge and discharge times, in one of the detecting means.

GENERAL DESCRIPTION

Figure 1:
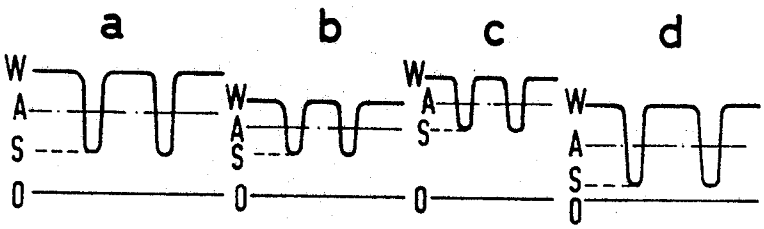

This invention relates to an equalization circuit for equalizing amplitude variations in an input pulse signal and, more particularly, to a circuit for producing an equalization signal dependent on the absolute amplitude values of the pulse peaks and the background level of an input signal and representing a preselected proportion of the relative amplitude of the pulse peaks with respect to the background level. The equalization signal thus developed may be employed to establish a threshold level of response of a pulse generator or other circuit which responds to the input pulse signal to produce an output pulse signal which corresponds in its pulse information content to that of the input pulse signal but is independent of amplitude variations in the latter.

The equalization circuit of the invention is set forth in a pulse response system for use with a photoelectric detection system for detecting information recorded on a carrier. The recording carrier (i.e., a tape or film) may illustratively have a light background and the information recorded thereon may comprise dark images, the contrast between the dark images and the light background enabling photoelectric detection of the recorded images and thus the information represented thereby. The carrier may be illuminated by a suitable illumination source and the light transmitted through the carrier may be detected by a suitable photoelectric detector positioned on the opposite surface of the carrier from the illumination means.

Where digital information is recorded on the carrier, i.e., information represented by the pressure or absence of a dark image on the carrier, there ideally results only two illumination detection levels in the photoelectric detector output. The first detection level is that of the background, and the second detection level is that produced by interception of the light rays from the illumination source by a dark image on the carrier, each of which levels ideally remains fixed at a predetermined value. Such ideal conditions, however, are not met in practice.

2

The dark current level of the photoelectric detection means, i.e., the output level thereof in the absence of illumination, may define a reference level. As a result of variations in the light transmission characteristics of the carrier at different positions along the length of a given carrier, or differences in the background characteristics of different carriers, the light transmission through the background portion of a recording carrier varies. As a result, the detected background level varies in absolute value, relative to the reference level.

The opacity of recorded information images is not constant, in practice, from point-to-point on a given carrier or between different carriers. The variation in opacity may result in two different forms of level variations in the detected signals. For a constant intensity scanning beam, the degree of opacity or, conversely, the light transmissivity of, a recorded information character which intercepts the scanning light beam will determine the extent to which the photoelectric detector is driven to its dark current level. Thus, the absolute peak magnitude of the pulse output of the photoelectric detector, measured from the reference level, will present a first variation. The opacity or light transmissivity of a recorded information character, relative to a given background level transmissivity, determines the contrast therebetween. Variations in either the light transmissivity of the background portion of the carrier, or of the recorded images, or both, may produce contrast variations. Variations in the contrast result in variations in the relative peak amplitude of the pulse signals, with respect to the background level, as detected by the photoelectric detector and comprise the second form of variations.

As a result, although only digital information is desired to be derived from the scanning of the recording carrier, it is apparent that undesired analog information is imposed on the digital information. The digit pulse signal produced by the photoelectric detector is typically applied as an input to a pulse generator or similar utilization apparatus. The pulse generator produces an output digit pulse signal having digit pulses of constant relative and absolute peak amplitude in response to the digit pulses of the input signal. However, in the absence of suitable controls, the analog variations imposed on the digital information of the input pulse signal may deleteriously affect the operation of the output apparatus, and cause it to generate erroneous output information. The equalization circuit of the invention prevents such erroneous generation of output information by output apparatus by restricting the response of the latter to only the digit or pulse information of the input signal. The equalization circuit of the invention includes a first means to measure the absolute amplitude of the detected background level and a second means to measure the absolute peak amplitude of the detected information digit pulses, and to generate, respectively, in response thereto, a first reference signal which represents the absolute amplitude of the background level and varies with variations therein, and a second reference signal which represents the absolute peak amplitude of the detected digit pulses and varies with variations therein.

The first and second reference signals are applied to a comparator circuit including impedance means across which is generated a difference signal. The difference signal represents the amplitude difference between the absolute amplitudes of the digit pulse peaks and the background level, and thus the relative peak amplitude of the digit pulses with respect to the background level. Adjustable tap means are provided for selecting a given position on the impedance means to derive an equalization signal representing any desired proportion of the difference signal developed across the impedance means. Since the difference voltage represents the difference between the first and second reference signals, it will be apparent that the equalization signal varies with variations in the absolute amplitudes of both the background level and the pulse peaks, while at all times representing a fixed proportion of the relative pulse peak amplitude. The equalization signal establishes a threshold level of response of the pulse generator whereby the latter responds only to portions of the input digit pulses which exceed the equalization signal at any given time. The pulse generator response is therefore independent of variations in the absolute magnitude of either the pulse peak magnitudes or the background level magnitude.

In accordance with a further embodiment of the invention, means are provided for maintaining the first and second reference levels, and thus the equalization signal, once established, for an extensive period of time. Thus, if either no information images are detected, or if a lengthy image obliterates background detection of the carrier for scanning periods of long duration, an equalization signal of at least an approximately correct value, based on earlier received information detected from the carrier, is maintained.

In accordance with still a further feature of the invention, a minimum contrast level control is provided which requires that the relative peak amplitude of a digit pulse in the input signal exceed a predetermined contrast threshold level for permitting the presence of a corresponding digit pulse in the output signal. The contrast level control therefore requires that recorded images have a minimum contrast level relative to the background of the carrier. Inadvertent markings or imperfections in the recording carrier which might otherwise be detected and result in the production of digit pulses in the output signal are thereby suppressed. The detection of images exceeding the contrast level therefore results in the production of digit pulses in the output signal which accurately and reliably represent actual information images recorded on the carrier.

PRIOR ART

Various prior art systems have been provided to compensate for amplitude variations in digit pulses. More particularly, such prior art compensation systems have been provided for use with photoelectric scanning and detecting systems to compensate for amplitude variations in digit pulses derived from scanning of a recording carrier.

One such prior art system is disclosed in Deutsche Auslegeschrift 1,099,244. A first difference signal comprising the difference between the output levels of a photoelectric detecting device, produced in scanning the background of the carrier and, produced under dark current conditions, is developed. The dark current condition represents the output current level of the photoelectric detecting device in the absence of illumination, and thus is independent of variations in the carrier background transmissivity and constitutes a constant reference level. In the alternative, a constant reference level may be derived by disconnecting the photoelectric detecting device. The first difference signal thus developed is compared with a control signal of predetermined amplitude. A second difference signal is derived from the last comparison and employed to control the photoelectric detecting device such that the second difference signal is reduced to a minimum or disappears. In effect, the photoelectric detecting device is controlled to produce an output signal during scanning of the background of the carrier which always closely approximates the constant reference signal, and variations in the light transmissivity in the carrier background are thus compensated for in the background signal level. Although such a system provides equalization for variations in carrier background transmissivity, it does not recognize or provide compensation for variations in the contrast of the recorded information images relative to the background of the carrier.

Another prior art system is disclosed in U.S. Patent 2,923,408, and comprises somewhat the converse of the above described prior art system. The amplitude of the peaks of digit pulses produced by photoelectric scanning of recorded information characters on a carrier, and the output amplitude of the photoelectric scanning device when directly illuminated by its associated illumination means, i.e., without the carrier or any other element interposed therebetween, are developed and compared to produced a first difference signal. The first difference signal is compared with a reference signal, and a second difference signal representing the difference therebetween is derived. The second difference signal is employed to adjust the photoelectric detecting device to reduce the second difference signal to a minimum, thereby compensating for variations in the carrier background transmissivity. The system of U.S. Patent 2,923,408 suffers from the same defect as that of Deutsche Auslegeschrift 1,099,244, in that no compensation for variations in the contrast between the recorded information images and the background of the carrier is provided.

Another prior art system is disclosed in Deutsche Auslegeschrift 1,164,462. In this system, a variable control potential is produced, the level of which depends on the intensity of the light transmitted through the carrier in the portions thereof surrounding recorded information characters, and which periodically increases and decreases the cross section of the scanning beam during scanning. Point-by-point scanning of the recorded information characteristics thus is effected. A reference level potential is derived which corresponds to the output level of the photoelectric detection device during scanning with the increased beam cross section in the region of the background surrounding the character images. In this system, the difference between the reference level potential and the output level produced in scanning recorded information characters is employed to produce a threshold responsive level. The threshold response level therefore corresponds to the detected contrast between the background, in the regions thereof adjacent recorded information characters, and the information characters themselves. However, the reference potential thus derived is dependent upon the form or configuration of the recorded characters, and thus on the information content thereof. As a result, the reference or control potential is subject to variation in accordance with the configuration of the recorded information characters and not only in response to actual variations in contrast.

A further prior art system is disclosed in Deutsche Auslegeschrift 1,156,848 and comprises a compensation system for amplitude variations in a digit pulse signal, which is dependent on the information content of the recordings on a carrier. An amplitude selection circuit receives an input digit pulse signal and is switchable from a first conductive condition, in the absence of digit pulses, to a second conductive condition in response to receipt of digit pulses. A threshold level comprising a variable reference potential controls the switching to the second conductive condition. The variable reference potential comprises a constant potential of preselected amplitude and a variable potential which varies in response to variations in the peak amplitude of the digit pulses in the input waveform. As a result, the amplitude selection circuit responds only to digit pulses having peak amplitudes which exceed the threshold level. However, no compensation for variations in the contrast, or the relative peak amplitudes of the digit pulses, as compared to the background level of the input signal is provided.

OBJECTS OF THE INVENTION

The equalization circuit of the invention overcomes these and other objections and disadvantages of prior art systems. More particularly, the equalization circuit equalizes variations in the peak magnitudes of digit pulses, both as to the absolute value thereof measured from a fixed reference, and as to the relative value thereof measured with respect to a base or background level. The equalization circuit produces an equalization signal which may be selected to represent a fixed proportion of the relative peak amplitude of the digit pulses. A pulse response system may be controlled by the equalization circuit to respond only to digit pulses in an input pulse wave which exceed a variable response threshold level established by the equalization signal.

It is therefore an object of this invention to provide an improved equalization circuit for a pulse response system.

A further object of this invention is to provide an equalization circuit for a pulse response system for producing a variable response threshold compensating for changes in both the absolute and relative peak amplitudes of digit pulses in an input digit pulse signal.

Another object of this invention is to provide an equalization circuit for a pulse response system for establishing a variable response threshold which varies both with the absolute amplitude and the relative amplitude of the peak value of digit pulses in an input digit pulse wave, and which may comprise a fixed proportion of the relative amplitude of the digit pulse peaks measured with respect to a background level of the input wave.

Still another object of this invention is to provide an equalization circuit for a pulse response system wherein digit pulses are produced in an output pulse signal only in response to the occurrence of input digit pulses having a relative peak amplitude value with respect to a background level of an input digit signal which exceeds a predetermined minimum value.

These and other objects of this invention will become apparent as the following description proceeds.

DESCRIPTION OF THE INVENTION

Figure 2:
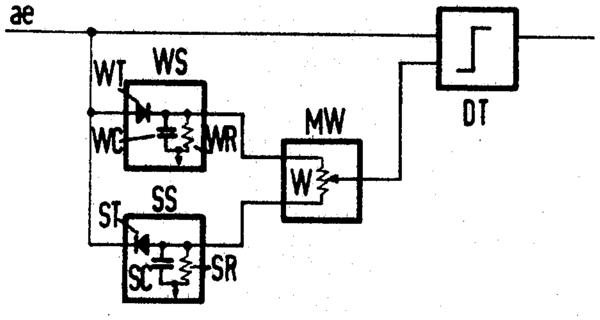
Figure 3:
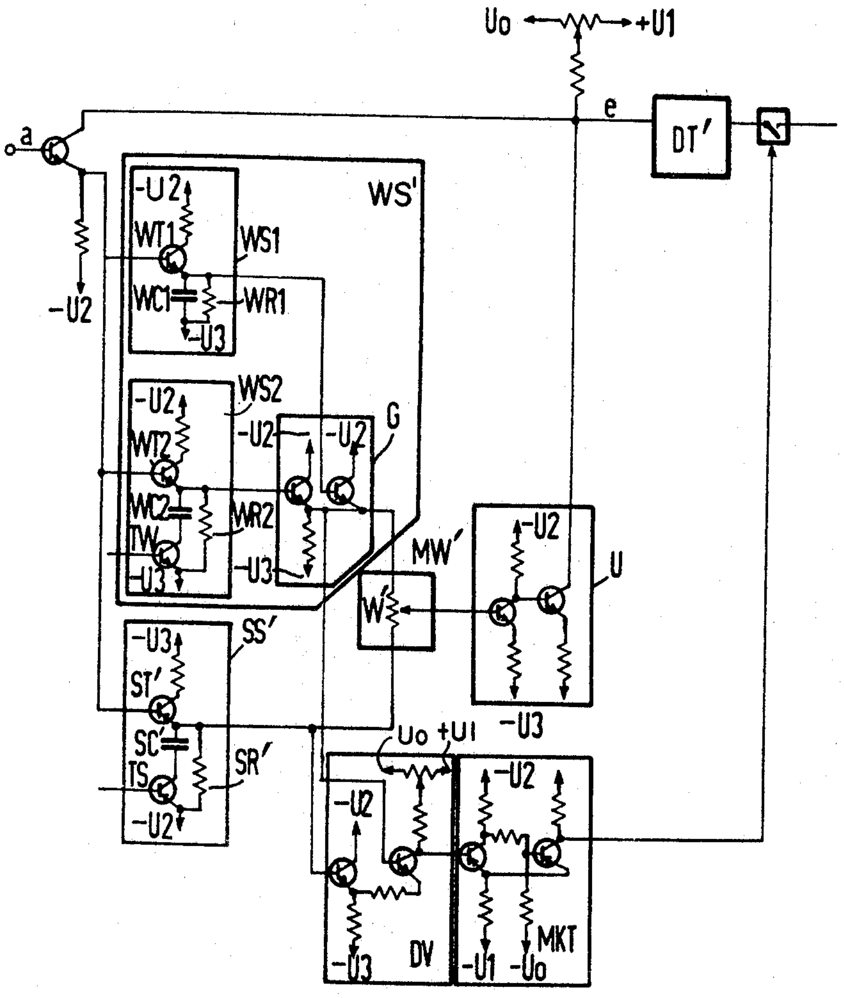

In the drawings:

FIGS. 1*a* to 1*d* show digit pulse waveforms wherein the digit pulses have various different relative and absolute peak amplitudes and wherein the background levels have various different absolute values, measured from a fixed reference level;

FIG. 2 shows an embodiment of an equalization circuit in accordance with the invention; and FIG. 3 shows another embodiment of an equalization circuit in accordance with the invention, including a minimum contrast level control.

In each of FIGS. 1*a* to 1*d*, the reference level represented by the solid horizontal line labeled 0 may represent the output of a photoelectric detecting device in the absence of a scanning signal, i.e., in absence of any illumination, and thus at what is known as its dark current level. The dark current level typically occurs when the energization of the illuminating means is terminated during return of a carrier following scanning of a given column and preparatory to scanning of a subsequent column on the carrier. Each of the waveforms represents the signal output of a photoelectric detecting device derived from scanning a carrier having a light background and having recorded thereon two information images, each of which represents one digit of information. The recorded information images are of substantially reduced light transmissivity relative to the background level of a carrier. The level W represents the amplitude of the scanning signals derived from scanning the carrier background. The level S represents the peak amplitude of the digit pulses resulting from scanning of the recorded information characters.

The peak amplitude S of the digit pulses is characterized by an absolute value, as measured from the reference level 0, and a relative value, as measured from the background level W.

The equalization circuit of the invention produces an equalization or threshold signal dependent on both the absolute and relative peak magnitudes of the digit pulses, and which may be selected to represent any desired proportion of the relative peak digit pulse amplitude. The threshold signal is shown in each of FIGS. 1*a* to 1*d* by a horizontal, alternately dot and dash line labeled A.

FIGS. 1*a* to 1*d* represent various conditions which may occur in scanning a recording carrier. In FIG. 1*b*, as compared with FIG. 1*a*, the background level W is decreased in amplitude, occurring, for example, due to a decrease in the transmissivity of the carrier background, assuming a constant illumination and the absence of the other variations, such as in the response characteristics of the photoelectric detecting device. The opacity or transmissivity of the recorded information images is the same, however, with the result that the absolute peak magnitudes of the digit pulses remain the same. There results, however, a decrease in the relative peak amplitude of the digit pulses from FIGS. 1*a* to 1*b*. The threshold level A decreases due to the decrease in the relative peak amplitude of the digit pulses resulting from the decrease in the background level W for a constant peak level S. The threshold level A, however, continues to represent a fixed proportion of the relative peak amplitude of the digit pulses S relative to the background level W.

In FIG. 1*c*, however, as compared to FIG. 1*a*, the background levels W are the same, however, the peak amplitude level S of the digit pulses has increased in absolute value and decreased in its relative value. The threshold level A is also increased in FIG. 1*c*, relative to FIG. 1*a*, due to the increase in absolute peak amplitude level S, the level A again representing a fixed proportion of the relative peak amplitude of the digit pulses. The waveform of FIG. 1*c* contains digit pulses of the same relative peak amplitude as that of the digit pulses in the waveform of FIG. 1*b*.

A further example of a possible variation in the output of a photoelectric detecting device is shown in FIG. 1*d*. The relative peak amplitude of the digit pulses is the same as that of FIG. 1*a*. However, in FIG. 1*d*, the absolute levels of the peak amplitudes S of the digit pulses and of the absolute value W of the background level of the signals are lower by an equal amount than the respective values in the waveform 1*a*. The threshold level A in FIG. 1*d* is thus lower than the level A of FIG. 1*a*, and since the level A is of the same fixed proportion of the relative peak amplitude of the digit pulses, it is lower than the level A of FIG. 1*a* by an amount equal to the difference in the absolute peak amplitude level S thereof.

In summary, the threshold level A as shown in FIGS. 1*a* to 1*d* varies with changes in both the relative and the absolute peak amplitude values of the digit pulses. In addition, the threshold level A at all times represents a fixed proportion of the relative peak amplitude values of the digit pulses regardless of changes in the relative peak amplitude value.

In FIG. 2 there is shown a circuit in accordance with a first embodiment of the invention for deriving the variable threshold or equalization signal at the level A of FIG. 1*a* told, in a pulse response system. An input signal having a pulse waveform in accordance with any of the waveforms of FIGS. 1*a* to 1*d*, and subject to variations shown therein, is applied to the input line *ae*. The input signal is coupled from the line *ae* to first and second registers WS and SS, and to the input of a pulse response circuit shown in block diagram form as the element DT. The circuit DT may comprise a pulse generator of well-known type for generating a square wave pulse, or other suitable pulse of fixed absolute peak amplitude relative to a fixed reference level, in response to each input pulse received at its first input. The first and second registers WS and SS, respectively, produce first and second reference signals which are applied to comparator circuit MW from which a threshold signal is derived. The threshold signal is applied to a threshold input of the circuit DT to limit or control the response thereof.

The first register circuit WS produces, at its output, a first reference level signal having a value equal to the absolute value of the background level of the input signal. The register circuit WS includes an input diode WT connected at its anode to the line *ae* and at its cathode to a parallel cricuit of a resistor WR and a capacitor WC, the latter being connected to a negative power supply terminal as indicated by an arrow. The output of the register WS is derived from the junction of the cathode of the diode WT common to the RC network WR, WC.

The second register circuit SS produces, at its output, a second reference level signal having a value equal to the absolute value of the digit pulse peaks of the input signal. The second register SS includes a diode ST poled oppositely to the diode WT. The diode ST is connected at its cathode to the line *ae* and at is anode through a parallel RC network formed of a resistor SR and a capacitor SC, to a negative power supply terminal, as indicated by an arrow. The output of the second register SS is taken from the common junction of the anode of the diode ST and of the RC network SR, SC.

The first and second reference level outputs of the first and second registers WS and SS, respectively, are applied to the opposite terminals of a potentiometer W in the comparator circuit MW.

The charging time constants of the RC network WR, WC of the registers WS and SR, SC of register SS may each be of the same order of magnitude as that of the duration of a single digit pulse produced by scanning of the record carrier. The digit pulse duration, for example, may be 5 microseconds. A suitable charge time constant would then be, for example, 2 microseconds.

For the polarity of the input signals as indicated in FIGS. 1*a* through 1*d*, the diode WT is poled to pass the positive potential amplitude of the background level W, whereby capacitor WC charges rapidly to the value of the potential represented by the background level W in a period of time of approximately 2 microseconds, as previously indicated. The discharge time constant of the RC network WR, WC is substantially greater than the duration of a given digit pulse, indicated previously to be 5 microseconds and, for example, may exceed the 5 microseconds duration by a factor of $10^3$. A suitable discharge time constant would be, for example 1 millisecond. The RC network, WR, WC therefore maintains the first reference level signal at the potential of the background level W regardless of the presence of digit pulses, but is of sufficiently fast discharge time constant such that the first reference level varies with amplitude variations in the background level W.

The first reference level signal is applied through the resistance of the potentiomeetr W to the RC network SR, SC and to the diode ST of the second register SS. The diode ST is thereby poled for conduction on the occurrence of digit pulses in the input signal. The capacitor SC charges rapidly to the absolute peak value of the digit pulses in a period of about 2 microseconds, as indicated previously. The discharge time of RC network SR, SC, however, also exceeds the 5 microseconds duration of the digit pulses by a factor of $10^3$, and may also be of 1 millisecond duration. Thus, the second reference level signal is maintained substantially constant at the absolute peak amplitude value of the digit pulses, but varies with variations therein.

There is thereby produced across the resistance of the potentiometer W a difference signal representing the difference in the absolute peak amplitude S of the digit pulses and the absolute amplitude of the background level W of the input signal. The difference signal therefore comprises the relative peak amplitude value of the digit pulses. The difference potential across the potentiometer W is in series with the second reference level signal and thus varies with variations in the absolute peak amplitude of the digit pulses.

An adjustable tap is provided on the potentiometer W, and may be positioned to select any desired proportion of the difference potential established across the resistance thereof. The tap may be positioned, for example, at a midpoint of potentiometer W such that the voltage appearing at the tap represents 50% or one-half of the difference voltage. The potential at the tap when at the midpoint position is therefore midway between the absolute peak amplitude level S and the absolute amplitude of the background level W as indicated by the threshold level A in the waveforms of FIGS. 1*a* to 1*d*. The voltage thus derived from the tap of the potentiometer W of comparator circuit MW comprises an equalization signal which at all times represents a preselected proportion of the relative peak amplitude value of the digit pulses of the input signal.

The equalization signal is applied to the input of the pulse generating circuit DT to establish a response threshold of the latter to the input signals. The equalization signal exceeds, in any given case, the smaller of the reference signals produced by the two register circuits WS and SS by a preselected, specific fraction or proportion of the difference between the two register signal levels. Although the equalization signal is indicated in FIG. 2 as being applied directly to the circuit DT, it may, in the alternative, be reversed in phase and added to the input signal within the circuit DT. In either case, the equalization signal maintains a variable response threshold which limits the response of the circuit DT to digit pulses in the input signal which exceed the threshold level. For the polarity of the input signals of FIGS. 1*a* to 1*d* the digit pulses exceed the level A in a negative direction, and are effective to cause circuit DT to generate corresponding output digit pulses. Portions of the input signal which do not exceed the level A will thus be ineffective to cause the generation of output signals.

The equalization circuit of the invention provides the very desirable effect of equalizing changes in the maximum and/or minimum amplitudes of the input scanning signal to compensate for analog variations unavoidably imposed on the digital information contained therein. The circuit also has the feature that, because of the very short charging time constants of the registers WS and SS, it adapts very quickly to changes in the amplitude of the scanning signal levels, resulting from variations in the transmissivity of the recording carrier background and the recorded information images.

Further, the register circuits WS and SS maintain the reference signals even in the absence of reference level information for substantial time periods. For example, even if information images are absent for long intervals, or appear relatively seldom, the reference signal relating thereto will nevertheless be maintained to assure the development of a correct equalization level, based on previously received information. A similar result obtains for the occurence of an information image which obliterates the carrier background for long intervals.

In FIG. 3, there is shown a further embodiment of the invention comprising an equalization circuit providing additional compensation for fluctuations in light transmissivity of the carrier, and the resultant amplitude variations in the scanning signal. Although the circuit of FIG. 2 compensates for such variations when they occur at a relatively slow level, the circuit of FIG. 3 compensates for these variations even when they occur at a rate exceeding the response rate of the RC charging networks of the first and second register circuits WS and SS of FIG. 2.

In accordance with the embodiment of the invention shown in FIG. 3, there are provided first and second register circuits, at least one of which includes first and second component register circuits. The first component register circuit includes a small charge time constant factor of, for example, 2 microseconds, as in the register circuits WS and SS of FIG. 2. The first component register circuit, however, has an equally small discharge time constant which thus may be similarly of 2 microseconds.

The second component register circuit has a substantially longer charge time constant which, for example, may be of about 100 microseconds and a large discharge time constant of, for example, 1 millisecond. The 1 millisecond discharge time constant is in accordance with those of the register circuits WS and SS of FIG. 2, and is an order of magnitude of about $10^3$ times the duration of the digit pulses. The charging time constant of the second component register circuit thus lies between the common charging and discharging time constants of the first component register circuit and the discharging time constant of the second component register circuit. The outputs of the two component register circuits are applied to a gate circuit which transmits, in any given case, the larger of the output signals of the two component register circuits. The output of the gate circuit comprises a first reference level signal produced by the first register circuit comprising the two components register circuits.

The reference level signal thus developed by the register circuit, having two components register circuits of different time constants, provides a reference level signal normally corresponding to the average signal level derived from scanning the background of the recording carrier and which varies with the relatively slow variations in the transmissivity thereof. However, the reference signal also provides a rapid response to short-time rapid increases in the transmissivity of the recording carrier background and thus to rapid increases in the background level amplitude of the scanning signal. It will be understood that the described register circuit of two component registers may, in the alternative, respond to the digit pulses, or that both register circuits may comprise two component registers for providing rapid response to short term or rapid variations in the detected amplitude levels of the background and the digit pulse peaks.

Referring more particularly to FIG. 3, a register circuit WS′ including first and second component registers WS1 and WS2 is provided for developing a first reference level signal related to the background level of the scanning signal. The first and second component output signal levels are applied to a gate circuit G, at the output of which is produced the first reference level signal, which in turn, is applied to a first input of the comparator circuit MW′. There is further provided a second register circuit SS′ which produces a second reference level signal related to the absolute peak amplitude of the digit pulses of the scanning signal, and which is applied to a second input of the comparator circuit MW′.

The scanning signal, which may have a waveform similar to those of FIGS. 1*a* to 1*b*, is applied to an input line *a* connected to the base of an NPN transistor, the emitter terminal of which is connected through a resistor to a negative power supply terminal U2. The NPN transistor operates as an emitter follower and provides the input signal received on line *a* in the same phase to the first and second register circuits WS′ and SS′. Input scanning signals having polarities as shown in FIGS. 1*a* to 1*b*, will thus be of the same polarity when derived from the emitter terminal of the NPN transistor and applied to the inputs of the register circuits WS′ and SS′.

Each of the component registers WS1 and WS2 of the first register circuit WS′ includes an element which is capable of transmitting only the scanning signals resulting from scanning the background of the recording carrier. More particularly, the background signals are of positive polarity and are applied to the base terminals of the NPN transistors WT1 and WT2, causing the latter to conduct.

An RC network comprising capacitor WC1 and resistor WR1 is connected between the emitter terminal of transistor WT1 and a negative power supply terminal —U3. The collector terminal of transistor WT1 is connected through a resistor to a relatively more positive power supply terminal —U2. The first component register circuit WS1 has approximately equal charging and discharging time constants of, for example, 2 microseconds.

The second component register circuit WS2 includes an RC network comprising resistor WR2 and a capacitor WC2 respectively connected in series with the collector and emitter terminals of a switching transistor TW to a negative power supply terminal —U3. The function of the switching transistor TW will be explained hereafter. The collector terminal of transistor WT2 is connected through a resistor to a relatively more positive power supply terminal —U2. The discharging time constant of the second component circuit WS2 is relatively long and, for example, may be of 1 millisecond, and thus approximately the same as that of the first register circuit WS of FIG. 2. The charging time constant of circuit WS2 is of an intermediate value, approximately midway between the large discharging time constant of 1 millisecond and the relatively short charging time constant of 2 microseconds and, for example, may be of about 100 microseconds.

Gate circuit G comprises first and second NPN transistors, each of which is connected at its collector terminal to a positive power supply terminal —U2, and the emitter terminals of which are connected in common through a resistor to a relatively more negative power supply terminal —U3. The component reference level signals from the first and second component circuits WS1 and WS2 are applied to respectively associated ones of the two NPN transistors of gate cricuit G. The one of the two NPN transistors to which the larger of the component reference level signals is applied will thus be rendered conductive and, through the voltage drop thus developed across the common emitter transistor, will render the other of the two NPN transistors nonconductive. The reference level output signal of the gate circuit G therefore represents the larger of the two component reference level signals developed by the component register circuits WS1 and WS2.

The second register circuit SS′ comprises a PNP transistor ST′ connected at its emitter through an RC network comprising a resistor SR′, and a capacitor SC′ which is connected in series with the collector and emitter terminals of a switching transistor TS to a negative power supply terminal —U2. The function of the switching transistor TS will be explained hereafter. The collector terminal of transistor ST is connected through a resistor to a relatively more positive power supply terminal —U3. The scanning signal derived from the emitter resistor of the input NPN transistor is applied to the base of the PNP transistor ST′ of the second register circuit SS′. Due to biasing conditions to be described, the PNP transistor ST′ is rendered conductive only during the occurrence of digit pulses derived from scanning information images recorded on the recording carrier. The register SS′ develops a second reference level signal at the junction of the emitter terminal of transistor ST′ and the RC network SC′, SR′, representing the absolute peak amplitude of the digit pulses.

The first reference level signal from gate G of the first register circuit WS′ and the second reference level signal from the second register SS′ are applied to opposite terminals of potentiometer W′ in comparator circuit MW′. A tap provided on the potentiometer W′ may be adjusted for selecting a desired proportion of the difference signal developed thereacross in accordance with the function of the comparator circuit MW of FIG. 2. The voltage derived from the tap of potentiometer W' is applied to an isolation and amplifying circuit U comprising a first NPN transistor connected at its collector to the base of a second NPN transistor. The output of the phase reversal stage U is derived from the collector terminal of the second NPN transistor and applied to the input line *e* connected to the input of the circuit DT'. Circuit DT' may comprise any suitable circuit for responding to input pulses to produce output pulses of a fixed amplitude and desired wave shape, relative to a fixed reference level, in accordance with the circuit DT of FIG. 2.

It is noted that the input signals at input line *a* are reversed in phase by the input NPN transistor as applied to the input line *e* to pulse circuit DT'. The signals derived from the emitter circuit of the input NPN transistor are, however, not reversed in phase and thus the equilization signal derived from the tap of potentiometer W' in comparator circuit MW' is of the same phase as that of the input signal at line *a*. The two NPN transistor stages of phase reversal stage U effect a double or two-fold phase reversal of the equalization signal, such that, as applied to line *e* at the input of circuit DT, the equalization signal is of opposite polarity to the scanned signals present on line *e*.

As discussed previously with regard to the comparator circuit MW of FIG. 2, the setting of the potentiometer W' of comparator circuit MW' of FIG. 3 determines the proportion of the difference signal which is preselected for use as a threshold or equalization signal. As shown in the wave forms of FIGS. 1*a* to 1*d*, the setting may illustratively be made to preselect a level representing 50%, or the midpoint, of the difference between the two reference level signals. The level A of the threshold or equalization signal is therefore midway between the background level W and the digit pulse peaks S. The threshold or equalization level A therefore represents the arithmetical average of the magnitude of the scanning signals resulting from scanning the background portions of the carrier and the magnitude thereof resulting from scanning of the information images recorded on the carrier. Should the level of the scanning signals resulting from scanning either the background or the information images on the carrier change, as shown in FIGS. 1*a* to 1*d*, there results a change in the arithmetical average, and thus a change in the threshold or equalization signal level A.

In FIG. 3, the equilization or threshold signal and the scanning signal are added in opposite phase on the line *e* at the input to the pulse response circuit DT'. Thus, equalization of the input scanning signal at the threshold or equalization level A, as indicated in FIGS. 1*a* to 1*d*, is achieved prior to the application of the scanning signal to the circuit DT'. The input line *e* to the circuit DT' is connected through a resistor to a variable tap associated with a potentiometer, the opposite terminals of the resistor of which are connected to a positive power supply terminal +U1 and a relatively more negative terminal U0, which may be at ground potential. The biasing circuit thus provided may be adjusted to determine a fixed reference level of the response threshold of the pulse response circuit DT.

The circuit of FIG. 3 also provides a contrast level control which establishes a minimum threshold value which must be exceeded by the relative peak amplitude of the digit pulses if corresponding output pulses are to be generated in response thereto. For a given recording carrier, the contrast between the recorded information images and the background of the recording carrier may be so low that the recorded images cannot be detected with a sufficient degree of certainty. For example, extraneous marks and imperfections in the recording carrier may be of a contrast level which equals or exceeds that of recorded images. As a result, if a contrast level threshold were not maintained, output digit signals might be generated indiscriminately in response to detection of such inadvertent markings, in addition to intended information character images.

The circuit of FIG. 3 permits the transmission of digit output pulses only for the detection of recorded character images having a predetermined value of contrast relative to the background of the carrier. Thus, output digit pulses generated by the circuit DT' in response to digit pulses in the input scanning signal which are subject to the uncertainty condition or factor are eliminated from the output pulse signal. In place of the eliminated digit pulses, the output signal is maintained at a signal level corresponding to that representing scanning of the beckground of the recording carrier.

The contrast level control comprises a difference amplifier DV, a threshold value switch MKT and a gate connected in the output circuit of the pulse generating circuit DT'. The difference amplifier DV generates a difference signal representing the actual contrast or amplitude difference between the digit pulse peaks and the background level of the input scanning signal. The threshold switch MKT, which may comprise a Schmitt trigger, has a switching response threshold corresponding to the minimum contrast level which, according to predetermined evaluations, is the minimum level of accurate response.

The threshold switch MKT is actuated and produces an output only when the contrast signal output of the difference amplifier DV exceeds the contrast threshold, and thus only when an adequate or sufficient contrast level exists between the pulse peaks and background levels of the scanning signal. The gate connected at the output of the pulse response circuit DT' is capable of transmitting the pulse output of the circuit DT' only at actuation of the threshold value switch MKT, and thus only when sufficient contrast has been detected.

The output of the second register circuit SS' representing the peak magnitude values of the digit pulses is applied to a first NPN transistor of the difference amplifier DV. The first transistor is connected at its collector to a power supply terminal —U2 and, at its emitter, through a resistor to a relatively more negative power supply terminal —U3. A second transistor of the difference amplifier DV is connected at its emitter through a resistor in series with the emitter resistor of the first amplifier to the negative power supply terminal —U3, and its collector through a resistor to the top of a veriable potentiometer. The resistor of the variable potentiometer is connected at its opposite terminals to a positive power supply terminal +U1 and to a relatively more negative power supply terminal U0 which may be at ground potential.

The output from the gate G of the first register circuit WS', representing the absolute magnitude of the background level is applied to the base of the second transistor of the difference amplifier DV. The output of the difference amplifier DV is obtained from the collector of the second transistor thereof, and represents the actual contrast between the recorded images and the background of the recording carrier.

The contrast signal thus produced by the difference amplifier DV is applied to the input of the Schmitt trigger of the threshold switch MKT. The threshold switch MKT is operable to produce an output signal only for input signals exceeding a predetermined minimum level. Thus, only when the contrast level signal from the difference amplifier DV exceeds the required minimum input level or contrast threshold established by the threshold switch MKT, does the latter produce an output signal. The output signal is applied to a gate schematically illustrated as a contact in the output circuit of the pulse response circuit DT. The gate thus provided is capable of transmission of a digit pulse in the output pulse signal produced by the circuit DT only during actuation of the threshold switch MKT and thus only for the occurrence in the input pulse signal of a digit pulse of a sufficient predetermined contrast level relative to the background level.

As described previously, there is provided a switching transistor TW in the second component circuit WS2 of the first register WS′ and a switching transistor TS in the second register circuit SS′. The transistors TW and TS, when in the "blocked" or non-conductive condition, prevent discharge of the respectively associated register condensers WC2 and SC′. As a result, the discharge time constants of these circuits as previously described, may be substantially extended. The switching transistors therefore enable the charging networks to maintain a previously established charge or reference signal value over a substantially longer period of time than otherwise would obtain.

The maintaining of the threshold values in this manner is particularly desirable during periods of cold or dark current of the photoelectric detecting devices. Such periods occur, for example, when the illumination means is cut off during retrace scans of recording carriers and in passing from a first to a second recording carrier to avoid inaccurate energization of the photoelectric detecting devices which might otherwise occur. Thus, by preventing discharge of the storage capacitors of the register circuits, a previously established equalization or threshold level can be maintained for substantial periods of time following an initial establishment thereof whereby accurate response to the detected information images of a subsequently scanned recording carrier is attained. For example, a prescanning interval may be provided in which a recording carrier is initially scanned to establish threshold or equalization reference levels, preparatory to a subsequent scan of the recording carrier for deriving digit pulses representative of the recorded information images.

In summary, the equalization circuits of the invention provide equalization of input digit pulse signals derived in photoelectric scanning or other operations to render a pulse response system non-responsive to variations in the absolute and relative peak amplitudes of the digit pulses resulting from undesired analog information imposes on the input digit pulse signals. The equalization is effected through production of an equalization signal which comprises the smaller of the absolute pulse peak amplitude or the absolute background level amplitude of the input pulse signal plus a preselected proportion of the relative peak pulse amplitude, and varies in response to variations in the absolute and relative amplitudes. The equalization signal may either establish a response threshold of a pulse response circuit, or may be added in opposite phase to the input pulse signal, such that the pulse response circuit responds only to digit pulses exceeding the equalization level. The response control provided by the equalization signal renders ineffective the undesired analog variations while not affecting in any manner the digital information of the input digital signal.

The equalization effected in accordance with the invention does not require variations in the scanning levels or response characteristics of the photoelectric scanning means which generates the input signal in response to scanning of an information carrier. As a result, the input scanning signal accurately represents the contrast between information characters recorded on a carrier and the background of the carrier, and is not subject to artificial alteration of the corresponding detected signal levels and the relative amplitudes therebetween, as occurs with prior art equalization systems. The equalization signal represents at all times a preselected proportion of the relative peak amplitude of the digit pulse peaks, and thus accurately represents the actual contrast between recorded information images and the background of a recording carrier. In addition to providing equalization of input digit pulse signals to compensate for the described analog variations, the pulse response systems of the invention further provide a contrast level control. The contrast level control eliminates from the output of the system digit pulses generated in response to input pulses which are of such low peak amplitude relative to a background amplitude that they present an uncertainty factor as whether they represent the detection of an information image or alternatively the detection of an inadvertent marking of or a defect in the recording carrier. Further, since the equalization system of the invention equalizes an input digit pulse signal independently of the means of generating the signal, it is adaptable for use with systems wherein the generating means is not controllable to provide equalization of the signal generated thereby.

It will be evident that many changes could be made in the systems of the invention without departure from the scope thereof. As one such change, it is apparent that the system of the invention may operate to equalize an input pulse signal having the opposite phase to that indicated in the waveforms of FIGS. 1*a* to 1*d*. Accordingly, the invention is not to be considered limited to the particular embodiments disclosed herein, but only by the scope of the appended claims. It is therefore intended by the appended claims to cover all such modifications and adaptations as fall within the true spirit and scope of the invention.

What is claimed is:

1. In a circuit arrangement for compensation for changes not related to signal information in a scanning signal to be digitized which is obtained by scanning a record carrier having contrasting signal and back-ground level therein, such changes causing variations in the amplitude of the scanning signal responsive to signal information and variations in the amplitude of the scanning signal responsive to background, including first storage means (SS′) of low charge time constant and high discharge time constant for developing a first voltage responsive to variations in signal level, second storage means (WS1) of similarly low charge time constant and high discharge time constant for developing a second voltage responsive to variations in background level, a comparator circuit (MW) supplied with said first and second voltages for generating a compensating signal exceeding the smaller one of said first and second voltages by a predetermined fraction of the difference therebetween, and a digitizing circuit (DT) provided with the scanning signal and the output of said comparator circuit to adjust the threshold of response to the scanning signal to be at constant relative distances between the signal and threshold levels, the improvement comprising, in at least one of said first and second storage means, a first storage circuit of similarly low charge time constant to said first and second storage means, but of a discharge time constant approximately equal to its charge time constant, and a second storage circuit of similarly high discharge time constant to said first storage means and of a charge time constant higher than said low time constant but lower than said high time constant; and a gate circuit (G) supplied with the voltages derived by said storage circuits in said one means for supplying the larger voltage as the output voltage of said one means.

2. The apparatus of claim 1 in which each said storage circuit includes the combination of a storage capacitor and a discharge resistor, said first and second means each includes unilateral conducting devices connected between the source of the scanning signal and the respective storage circuits, said comparator includes a potentiometer connected between said first storage circuit and the output of said gate circuit and further including a phase reversal stage connected between the tap of said potentiometer and said digitizing circuit for delivering thereto the threshold signal therefor.

3. The apparatus of claim 2 in which at least one of said first and second storage circuits includes a normally-closed switch (TW, TS) connected in series between the capacitor and resistor of that circuit to complete the discharge circuit for the capacitor, which switch may be opened to open the discharge circuit and cause extended retention of the charge on the capacitor.

4. The apparatus of claim 1 including a second gate circuit connected to the output of said digitizing circuit and a threshold value switch connected to said gate for allowing digitized signals through the gate only when the input to the switch exceeds a predetermined level, and control means connected to said first and second means for developing and supplying to said switch a voltage responsive to the difference between the signal and background levels on the carrier.

5. The apparatus of claim 1 in which at least one of said first and second storage circuits includes a switch (TW, TS) in the discharge circuit thereof which switch may be opened to open the discharge circuit.

References Cited

UNITED STATES PATENTS

| | | | |
|---|---|---|---|
| 2,247,324 | 6/1941 | Travis | 328—165 |
| 2,428,011 | 9/1947 | Chatterjea et al. | 328—164 |
| 2,523,283 | 9/1950 | Dickson | 328—165 |

DONALD D. FORRER, Primary Examiner

HAROLD A. DIXON, Assistant Examiner

U.S. Cl. X.R.

307—235, 317; 328—78, 146, 163; 333—28; 340—146.3